US008411120B2

(12) United States Patent
Wu et al.

(10) Patent No.: US 8,411,120 B2
(45) Date of Patent: Apr. 2, 2013

(54) GENERATION OF COLOR IMAGES

(75) Inventors: Pingfan Wu, Woodbury, MN (US); Douglas S. Dunn, Maplewood, MN (US); Dennis E. Vogel, Lake Elmo, MN (US); Stanley C. Busman, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 187 days.

(21) Appl. No.: 12/990,799

(22) PCT Filed: May 1, 2009

(86) PCT No.: PCT/US2009/042555
§ 371 (c)(1),
(2), (4) Date: Nov. 3, 2010

(87) PCT Pub. No.: WO2009/140083
PCT Pub. Date: Nov. 19, 2009

(65) Prior Publication Data
US 2011/0063392 A1  Mar. 17, 2011

Related U.S. Application Data

(60) Provisional application No. 61/053,362, filed on May 15, 2008.

(51) Int. Cl.
*B41J 2/325* (2006.01)
(52) U.S. Cl. ......................................................... 347/172
(58) Field of Classification Search .................. 347/172, 347/174, 175, 225, 234, 238, 241, 248, 252; 400/120.02, 120.03; 428/195.1, 411.1, 514
See application file for complete search history.

(56) References Cited

U.S. PATENT DOCUMENTS

| 2,995,466 | A | 8/1961 | Sorensen |
| 4,011,352 | A | 3/1977 | Janssens |
| 4,563,415 | A | 1/1986 | Brown |
| 4,647,525 | A | 3/1987 | Miller |
| 4,670,373 | A | 6/1987 | Kitaguchi |
| 4,889,932 | A | 12/1989 | Miller |
| 5,145,767 | A | 9/1992 | Whitcomb |
| 5,278,031 | A | 1/1994 | Boggs |
| 5,395,736 | A | 3/1995 | Grasshoff |
| 5,554,664 | A | 9/1996 | Lamanna |
| 5,770,737 | A | 6/1998 | Reinhardt |

(Continued)

FOREIGN PATENT DOCUMENTS

| DE | 2237833 | 2/1973 |
| EP | 1253022 | 10/2002 |

(Continued)

OTHER PUBLICATIONS

Leonard, Ultraviolet Spectra of Alkoxy- and Hydroxybenzils, J. Am. Chem. Soc., vol. 71, pp. 2997-3002, (1949).

(Continued)

*Primary Examiner* — Kristal Feggins
(74) *Attorney, Agent, or Firm* — Jeffrey M. Olofson

(57) ABSTRACT

Methods for generating a color image are provided which include a multi-layer construction in which at least one of the layers is a thermally activatable layer that includes a thermally activatable composition. The thermally activatable composition includes a non-linear light to heat converter composition and a color forming compound. Upon activation with a light source an image forms.

20 Claims, 1 Drawing Sheet

U.S. PATENT DOCUMENTS

| | | | |
|---|---|---|---|
| 5,859,251 | A | 1/1999 | Reinhardt |
| 5,914,213 | A | 6/1999 | Grasshoff |
| 6,017,640 | A | 1/2000 | Muthiah |
| 6,100,405 | A | 8/2000 | Reinhardt |
| 6,627,384 | B1 | 9/2003 | Kim |
| 6,801,233 | B2 | 10/2004 | Bhatt |
| 6,926,943 | B2 | 8/2005 | Berneth |
| 7,026,103 | B2 | 4/2006 | DeVoe |
| 7,166,558 | B2 | 1/2007 | Bhatt |
| 7,320,826 | B2 | 1/2008 | Kumar |
| 2002/0022140 | A1 | 2/2002 | Semersky |
| 2003/0035934 | A1 | 2/2003 | Shimomura et al. |
| 2003/0166467 | A1 | 9/2003 | Azuma |

FOREIGN PATENT DOCUMENTS

| | | |
|---|---|---|
| EP | 1295731 | 3/2003 |
| WO | WO 98/21521 | 5/1998 |
| WO | WO 99/53242 | 10/1999 |
| WO | WO 2005/108102 | 11/2005 |

OTHER PUBLICATIONS

Sabongi, Chemical Triggering: Reactions of Potential Utility in Industrial Processes, Plenum Press, New York, N.Y., chapter 2, pp. 68-72, (1987).

Schwartz, Aqueous Dissociation of Squaric Acid, J. Phys. Chem. vol. 74, No. 25, pp. 4374-4377, (1970).

Intl Search Report for PCT/US2009/042555, 3 pages.

Written Opinion for PCT/US2009/042555, 5 pages.

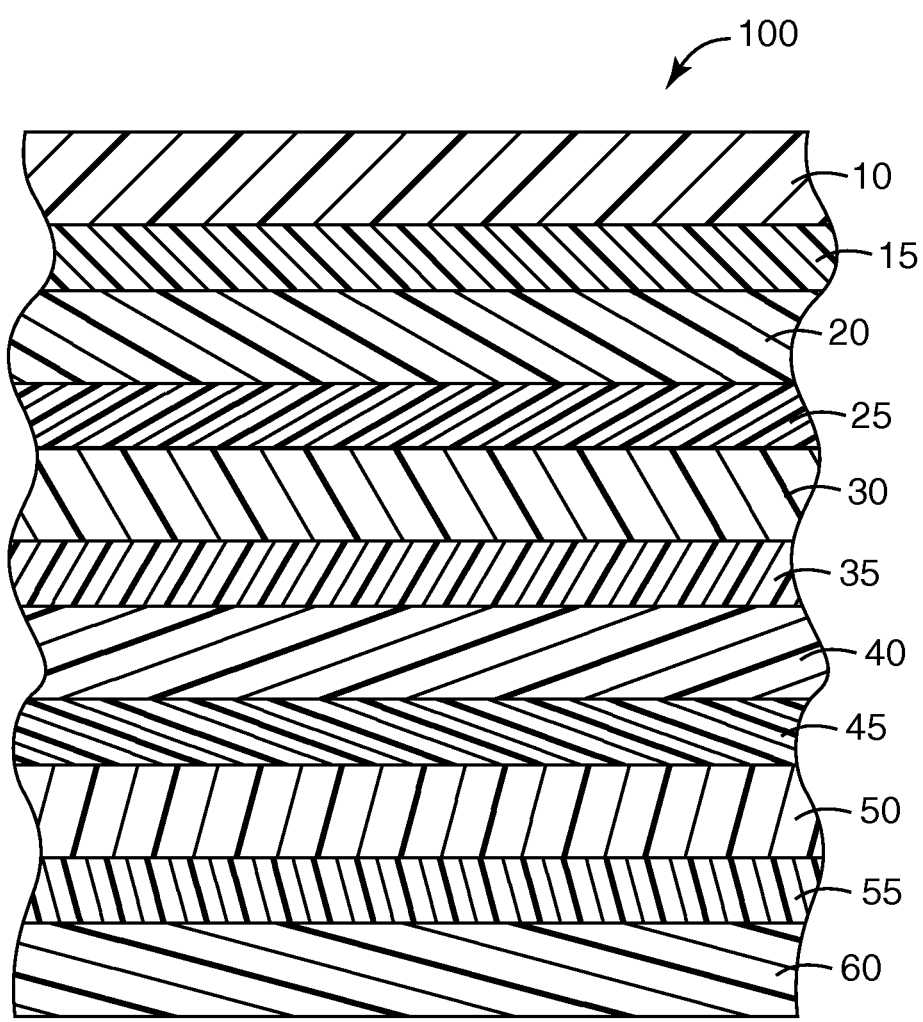

GENERATION OF COLOR IMAGES

CROSS REFERENCE TO RELATED APPLICATIONS

This application is a national stage filing under 35 U.S.C. 371 of PCT/US2009/042555, filed May 1, 2009, which claims priority to U.S. patent application Ser. No. 61/053,362 filed May 15, 2008, the disclosure of which is incorporated by reference in its/their entirety herein.

FIELD OF THE DISCLOSURE

The disclosure relates to methods for generating color images.

BACKGROUND

For many applications it is desirable to form color images. A variety of techniques have been developed to form color images, including printing techniques and other imaging techniques such as thermal imaging processes.

Among the thermal imaging processes are "thermal transfer" processes in which heat is used to move colored material from a donor sheet to a receiver sheet. Alternatively, heat may be used to convert a colorless coating on a sheet into a colored image in a process called "direct thermal" imaging. Generally in this process a thermal print head is used to address one line of the image at a time.

SUMMARY

Methods for generating color images are disclosed. These methods for generating color images include the steps of: providing a multi-layer construction wherein at least one layer comprises a thermally activatable composition, and is hereinafter referred to as a thermally activatable layer, and in which the thermally activatable composition comprises a non-linear light to heat converter composition and a color forming compound; and activating the at least one thermally activatable layer with a light source to form an image. The thermally activatable composition may optionally comprise a thermal acid generator and/or a fixing compound. In some embodiments, the light source comprises a focused laser. In other embodiments, the multi-layer construction comprises more than one thermally activatable layer. After exposing the multiple thermally activatable layers to the light source, an image, or portions of an image, forms on each of the thermally activatable layers, thus forming a three dimensional image on the construction.

BRIEF DESCRIPTION OF THE DRAWINGS

FIG. 1 shows a schematic cross section of an embodiment of a multi-layer construction.

DETAILED DESCRIPTION

In a variety of applications it is desirable to form a color image that is not on the surface layer or layers of a multi-layer article or construction, but that is instead formed internally within the construction on internal layers. Such a color image is more likely to be resistant to scratches, stains as well as tampering without requiring lamination of one or more protective layers over the image.

The image is generated within the multi-layer construction on one or more thermally activatable layers comprising the construction. The thermally activatable composition comprises a non-linear light to heat converter composition and a color forming compound. When the non-linear light to heat converter composition absorbs light from a light source, the conversion of light to heat causes localized heating to occur which induces color formation in the color forming compound. The light source may be chosen to give very selective activation, for example by using a narrow range of wavelengths or a single wavelength of light. For example, lasers can be used for this purpose. In some embodiments, the laser may be combined with focusing optics to focus the laser light on a specific location within the construction.

The term "multi-layer construction" as used herein refers to a construction comprising two or more layers. The layers may be of varying compositions and thicknesses. At least one of the layers of the multi-layer construction comprises a thermally activatable composition.

The term "thermally activatable composition" as used herein refers to compounds and compositions which upon the application of heating or warming undergo a detectable change in color. The composition may, and typically does, contain two or more components. The detectable change may be the formation of a detectable change, such as a change from a colorless or a lightly colored state to a highly colored or a different color state. The term "activation" as used herein refers to the process whereby a thermally activatable composition absorbs light, the light is converted to heat by the light to heat converter composition, and the heating causes a detectable color change in the color forming compound.

The term "light to heat converter composition" as used herein refers to compounds or compositions that generate heat upon the absorption of light.

The term "non-linear light to heat converter composition" refers to a light to heat converter composition in which the light energy absorption coefficient is intensity or fluence dependent, where intensity is energy per unit area per unit time and fluence is energy density or energy per unit area.

The term "color forming compound" as used herein refers to compounds that upon heating produce a detectable color change. A color change may be detectable either with the naked eye or by using optical devices, such as, for example, a camera or microscope. Typically the color change is from a colorless or lightly colored state to a more intensely colored state. The detectable color change may be the result of the application of heat alone or may be a combination of heat and interaction with other reagents.

The term "leuco dye" as used herein refers to compounds which change from essentially colorless to colored when heated, with or without the presence of other reagents.

The term "light source" as used herein refers to a source of radiation, for example, in the wavelength range of about 300-1500 nanometers. In some embodiments, the light source may be a laser. Lasers are well-known as sources of amplified, coherent electromagnetic radiation. In some embodiments, the laser may be combined with focusing optics to focus the laser output to a specific location along the z axis. As used herein, the term "z axis" refers to the depth or thickness of the multi-layer construction material, where the x-y plane defines the top or bottom surface of the material. In some embodiments the wavelength of the light source radiation is in the range 350-850 nanometers.

The term "fixing" as used herein refers to a post-imaging process step involving either exposure to radiation or heat to inactivate the color forming compound and prevent further imaging.

The term "image" as used herein refers to any pattern of optical contrast produced on the inside of a substrate that has a similar appearance to a person or object. The image can have a two-dimensional or three-dimensional appearance. The image can be observed directly with the naked eye or by an instrument such as an optical device like a camera or microscope. Text and indicia, such as for example a name, birth date, signature, employee number, social security number and the like as well as decorative patterns and designs are, for purposes of this disclosure, also considered to be images. A "full color image" is one which contains the colors cyan, magenta, yellow and black. A "durable image" is one which upon imaging retains its consistency for the desired lifetime of use of the article bearing the image. In some uses the desired lifetime may be relatively long such as one year, 5 years, or even 10 years or more. A "fixed image" is one to which a fixing step has been carried out.

The term "voxel" as used herein refers to a volume element in three dimensional space. The term is analogous to a pixel in two dimensional space.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "heteroalkyl" refers to an alkyl group which contains heteroatoms such as N, O, S or halogens (F, Cl, Br, I).

The disclosed methods for generating an image utilize multi-layer constructions. The multi-layer constructions may be prepared using a variety of techniques used to prepare multi-layer constructions. For example, the multi-layer construction may be prepared directly by sequential coating or laminating steps. Sequential coating steps may include using coating techniques to form the individual layers within the multi-layer construction. An individual layer may be formed by coating a film-forming composition and permitting the layer to form by, for example, drying if a solvent is used with the film-forming composition. Examples of useful coating techniques include, for example, die coating, knife coating, roll coating, gravure coating, rod coating, curtain coating, air knife coating and printing techniques such as screen printing or inkjet printing. The film forming composition may be coated onto a carrier film which may or may not become incorporated into the final construction or the layers may be sequentially coated to form the multi-layer construction.

Alternatively, the individual layers can be prepared separately and laminated together. For example, a series of individual layers may be prepared separately by coating techniques as described above and the separately formed layers may be laminated together to form the multi-layer construction. Lamination may involve the use of pressure, heat, adhesives or a combination thereof. Since at least some of the layers are thermally activatable, heat should be used cautiously to avoid premature activation of these layers. The layers may be adhered together across the entire surface of the layer or at selected points, such as at the edges.

In some embodiments it may be desirable to use a combination of techniques. For example, if thermally non-activatable layers (i.e. layers or films that do not comprise thermally activatable compositions) are present between, or on top of or below, the thermally activatable layers of the construction, it may be desirable to coat a film-forming composition containing the components of the thermally activatable composition dissolved or suspended in a solvent onto a thermally non-activatable layer. Upon drying, the resulting layer which is now a thermally activatable layer, can be laminated to other layers, covered with a thermally non-activatable film or coated with another film-forming composition to continue to build up the multi-layer construction.

The thermally activatable layers typically comprise a polymeric binder in addition to the non-linear light to heat converter composition and the color changing compound. Any suitable polymeric material may be used as the polymeric binder as long is doesn't interfere with the image formation, observation or stability. In some embodiments, a thermally activatable layer may comprise from 50 wt % to 99.8 wt % polymeric binder.

A wide variety of non-reactive polymeric binders may be used. The polymeric binders are useful, for example, to control viscosity and to provide film-forming properties. Such polymeric binders typically are chosen to be compatible with the thermally activatable composition materials. For example, polymeric binders that are soluble in the same solvent or solvents that are used for the thermally activatable composition and that are free of functional groups that can adversely affect the color change of the thermally activatable composition can be utilized. Polymeric binders may be of any suitable molecular weight to achieve the desired solution rheology and film-forming properties. In some embodiments, the number average molecular weight, Mn, may be between 5,000 and 1,000,000 Daltons, or 10,000 to 500,000 Daltons or even 15,000 to 250,000 Daltons. Suitable polymeric binders include, for example, polystyrenes, poly(methyl methacrylates), poly (styrene)-co-(acrylonitriles), cellulose acetate butyrates, poly (bisphenol A epichlorohydrin) glycidyl end-capped copolymers and the like.

Generally the film-forming composition that comprises the non-linear light to heat converter composition, the color forming compound and the optional polymeric binder also contains a solvent. After coating, the solvent is allowed to dry to give the thermally activatable layer. Suitable solvents include, for example: esters such as ethyl acetate or propylene glycol methyl ether acetate; ethers such as tetrahydrofuran and diethyl ether; ketones such as acetone, cyclopentanone and methyl ethyl ketone; alkanes such as hexane, heptane, and petroleum ether; arenes such as benzene and toluene; alcohols such as methanol, ethanol and isopropanol; and mixtures thereof.

Typically the multi-layer construction comprises at least one thermally activatable layer. In some embodiments the multi-layer construction comprises 2 or more thermally activatable layers, for example two thermally activatable layers, three thermally activatable layers or four thermally activatable layers. The thermally activatable layers may be the same or different, typically they are different to produce different colors upon activation. To achieve full color images, the multi-layer construction may comprise three thermally activatable layers which independently produce the colors cyan, yellow and magenta upon activation or four thermally activatable layers, which independently produce the colors cyan, yellow, magenta and black upon activation.

The thermally activatable layers may have a variety of thicknesses. Generally the layer thickness is selected to be thick enough to be readily selectively activated and to generate sufficient color to create a clear image. Typically the thermally activatable layers have a thickness of from about 2-50 micrometers, or about 5-25 micrometers.

Generally the thermally activatable layer comprises a single layer of material, but the thermally activatable layer may comprise sublayers. In this context, sublayers are continuous or discontinuous layers that together form the thermally activatable layer. For example, it may be desirable in some embodiments to prepare a thermally activatable layer which comprises separate sublayers of color forming compound and nonlinear light to heat converter composition. These thermally activatable sublayers may be separated by other sublayers comprising a thermally sensitive material, such as a wax. In this way, the thermally activatable sublayers are kept separated until activation by a light source. Such a sublayer configuration could be prepared by separately coating layers of non-linear light to heat converter composition and color forming compound and optional wax, instead of mixing the non-linear light to heat convertor composition and color forming compound and coating the mixture. Such a sublayer configuration is described, for example, in U.S. Pat. Nos. 6,801,233 (Bhatt et al.) and 7,166,558 (Bhatt et al.), and the sublayers of thermally sensitive material can help provide an additional physical barrier to accidental activation of the color forming compound in the thermally activatable sublayers by heat other than the heat generated by the desired activation by a light source. Upon activation, the wax melts and the sublayers interact and generate the desired color.

The multi-layer construction may include both thermally activatable as well as thermally non-activatable layers, or all of the layers may be thermally activatable. Typically, the exterior layer or layers of the construction are thermally non-activatable with at least one internal layer being thermally activatable. If a three dimensional image is desired, more than one thermally activatable layer should be present in the multi-layer construction.

Additionally, there may be thermally non-activatable layers between thermally activatable layers. The presence of thermally non-activatable layers between thermally activatable layers may help prevent the thermally activatable layers from interacting during preparation or during activation.

The thermally non-activatable layers, if used, may be prepared from any useful materials. Typically the layers comprise polymeric materials. In some embodiments the polymeric materials are thermoplastics, but elastomeric materials may also be used in certain embodiments. Generally, thermally non-activatable layers positioned above the thermally activatable layers in a multi-layer construction are transparent to visible light thus permitting the image formed in the thermally activatable layers to be visible. Thermally non-activatable layers that are below the image or not in the light path of the image need not be transparent to visible light.

Thermally non-activatable layers may be used to provide rigidity to the multi-layer construction and/or protection for the image formed by the thermally activatable layers. For example, the non-activatable layers may be used to provide chemical resistance, scratch resistance, shock resistance and tamper resistance for the image. The thermally non-activatable layers may exist as a single layer or multiple layers. If multiple layers are used, the multiple layers may comprise different compositions.

Examples of useful materials for thermally non-activatable layers include, for example, polyesters, polyurethanes, polyolefins, and polycarbonates.

The thickness of thermally non-activatable layers may be any suitable thickness, to provide, in combination with the thermally activatable layers, the desired thickness and mechanical and optical properties to the multi-layer construction. In some embodiments, the thermally non-activatable layers may vary from 5 micrometers to 50 micrometers in thickness. In some embodiments, for example it may be desirable to have relatively thick (that is to say greater than 50 micrometers) thermally non-activatable layers to provide rigidity and resiliency to the multi-layer construction. In other embodiments it may be desirable to have relatively thin thermally non-activatable layers. In still other embodiments it may be desirable to have some thermally non-activatable layers be relatively thick (such as, for example, the exterior layers of the multi-layer construction) and have other layers be relatively thin (such as, for example, the layers between the thermally activatable layers).

The thermally activatable layers include a non-linear light to heat converter composition. The light absorption through a medium follows Beer's Law as shown in equations 1 and 2 below:

$$I(z) = I_0 e^{-\alpha z} \quad (1)$$

or $$\frac{dI}{dz} = -\alpha I \quad (2)$$

where $I(z)$ is the intensity of the light at the medium penetration depth z, $I_0$ is the light intensity before it is attenuated by the medium, $\alpha$ is the absorption coefficient and I is the light intensity. For a linear light absorber, the absorption coefficient is a constant, independent of the light intensity or fluence. Nonlinear absorption, on the other hand, means that the absorption coefficient depends on the light intensity or fluence. This can lead to both increased transmittance with increasing light intensity or decreased transmittance with increasing light intensity.

A wide variety of non-linear light to heat converter compositions are useful. The nonlinear light absorbers may be two-photon absorption (2Ph) species or reverse saturable absorption (RSA) species.

The two-photon (2Ph) process is a nonlinear light absorption process in which the photon energy is approximately equal to half the energy required for linear excitation of the material. Excitation of the absorbing material therefore requires the simultaneous absorption of two of the lower energy photons. The absorption coefficient for this process is therefore light intensity dependent as shown in equation 3 below:

$$\alpha = \alpha_0 + \beta I \quad (3)$$

where $\alpha_0$ is the residual linear absorption coefficient and $\beta$ is the two-photon absorption coefficient.

Examples of useful two-photon absorbers include those exhibiting large multiphoton absorption cross-sections, such as Rhodamine B (that is, N-[9-(2-carboxyphenyl)-6-(diethylamino)-3H-xanthen-3-ylidene]-N-ethylethanaminium chloride and the hexafluoroantimonate salt of Rhodamine B) and the four classes of photosensitizers described, for example, in PCT Publication Nos. WO 98/21521 and WO 99/53242. The four classes can be described as follows: (a) molecules in which two donors are connected to a conjugated π-electron bridge; (b) molecules in which two donors are connected to a conjugated π-electron bridge which is substituted with one or more electron accepting groups; (c) molecules in which two acceptors are connected to a conjugated π-electron bridge; and (d) molecules in which two acceptors are connected to a conjugated π-electron bridge which is substituted with one or more electron donating groups (where "bridge" means a molecular fragment that connects two or more chemical groups, "donor" means an atom or group of atoms with a low ionization potential that can be bonded to a conjugated π-electron bridge, and "acceptor" means an atom or group of atoms with a high electron affinity that can be bonded to a conjugated π-electron bridge).

The four above-described classes of two-photon absorbers can be prepared by reacting aldehydes with ylides under standard Wittig conditions or by using the McMurray reaction, as detailed in PCT Publication No. WO 98/21521.

Other useful two-photon absorbers are described in U.S. Pat. Nos. 6,100,405, 5,859,251, and 5,770,737. These compounds are described as having large multiphoton absorption cross-sections.

The RSA process is also sometimes referred to as excited state absorption, and is characterized by the absorption cross section for the excited state involved in the absorption process being much larger than the cross section for excitation from the ground state to the excited state. The total light absorption involves both ground state absorption (the linear term) and excited state absorption. The equation describing the light intensity (I) as a function of depth of the material (z) is therefore given by equation 4:

$$\frac{dI}{dz} = -(\alpha_0 + \sigma N)I \tag{4}$$

where σ is the absorption cross-section for transitions from the excited state. The population density of the excited state N, is produced by ground state absorption (linear absorption) with absorption coefficient $\alpha_0$ and is given by equation 5 below:

$$dN/dt = \alpha_0 I/\eta\omega \tag{5}$$

where ħω is the incident photon energy.

Integration of equation (5) with respect to time, substitution into equation (4), and integration with respect to time again results in equation 6 below:

$$\frac{dF}{dz} = -\left[\alpha_0 + \frac{\alpha_0 \sigma}{2\eta\omega}F\right]F \tag{6}$$

These equations show that the dependence of the energy density, or fluence (F), of the light in the material depends on the square of the fluence. This equation is analogous to equation 3 above, with the term β replaced by $\alpha_0\sigma/2\hbar\omega$, and indicates that excited state absorption and two-photon absorption generally give nearly identical results for absorption of light by the material as a function of light intensity or fluence.

Examples of reverse saturable absorption materials that function as non-linear light to heat converter compositions include, for example, metallophthalocyanines, naphthalocyanines, cyanines, fullerenes, metal nanoparticles, metal oxide nanoparticles, metal cluster compounds, porphyrins, indanthrone derivatives and oligomers or combinations thereof. Examples of metallophthalocyanines include, for example, copper phthalocyanine (CuPC), and phthalocyanines containing metal or metalloids from group IIIA (Al, Ga, In) and IVA (Si, Ge, Sn, Pb). Examples of naphthalocyanines include, for example, the phthalocyanine derivatives of silicon (SiNC), tin (SnNC), and lead (PbNC). Examples of cyanines include, for example, 1,3,3,1',3',3'-hexamethylindotricarbocyanine iodide (HITCI). Examples of fullerenes include, for example, C60 and C70 fullerenes. Examples of metal nanoparticles include, for example, gold, silver, platinum, aluminum, and zinc nanoparticles. Examples of metal oxide nanoparticles include, for example, titanium dioxide, antimony tin oxide, and zirconium dioxide nanoparticles. Examples of metal clusters include, for example, iron tricobalt metal clusters such as $HFeCO_3(CO)_{12}$ and $NEt_4FeCO_3(CO)_{12}$. Examples of porphyrins include, for example, tetraphenylporphyrin (H2TPP), zinc tetraphenylporphyrin (ZnTPP), and cobalt tetraphenylporphyrin (CoTPP). Examples of indanthrone derivatives include, for example, unsubstituted indanthrone, oxidized indanthrone, chloroindanthrone, and an indanthrone oligomer.

In some embodiments, the non-linear light to heat converter composition comprises copper phthalocyanine, tin phthalocyanine, or a combination thereof.

The non-linear light to heat converter composition generally may be present in fairly small quantities. Typically the non-linear light absorber is present in the amount of about 0.05-5 weight % or even 0.1-3 weight %.

The thermally activatable layers also include a color forming compound. The color forming compounds typically are cyan-forming (i.e. forms a cyan color upon activation), magenta-forming (i.e. forms a magenta color upon activation), yellow-forming (i.e. forms a yellow color upon activation), or black-forming (i.e. forms a black color upon activation). Typically the color forming compound is a leuco dye. Leuco dyes are compounds which change from essentially colorless to colored by the input of heat, with or without the presence of other reagents.

A number of classes of leuco dye materials are useful as the color forming compounds of this disclosure. Among the useful materials are, for example: azines such as oxazines, diazines and thiazines; triarylmethanes such as fluoresceins, rhodamines and rhodols; ketazines; barbituric acid leuco dyes and thiobarbituric acid leuco dyes.

Examples of azine leuco dyes that are suitable for use as color forming compounds include those which can be described by Formula I below:

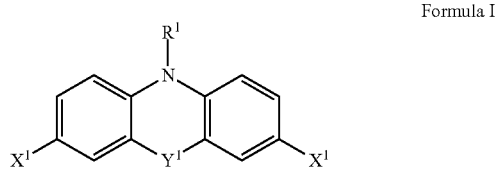

Formula I where $R^1$ is $-C(O)R^2$, where C(O) designates a carbonyl group, each $X^1$ can independently be $OR^2$, $NR^2_2$ or $SR^2$ and $Y^1$ can be O, $NR^2$ or S, where each $R^2$ is independently a hydrogen, an alkyl, an aryl, or a heteroalkyl. In Formula I, when $Y^1$ is an oxygen the compound is an oxazine, when $Y^1$ is equal to $NR^2$, the compound is a diazine and when $Y^1$ is equal to sulfur the compound is a thiazine. In some embodiments the color forming compound of Formula I has $X^1$ equal to $NR^2_2$, where $R^2$ is an alkyl, $Y^1$ is equal to oxygen, and $R^1$ is equal to $-C(O)Ar$, where Ar is an aryl group. In some embodiments the color forming compound of Formula I has $X^1$ equal to $NR^2_2$, where $R^2$ is an ethyl group, $Y^1$ is equal to oxygen, and $R^1$ is equal to $-C(O)Ph$, where Ph is a phenyl group.

Examples of triarylmethane leuco dyes include those which can be described by Formula II below:

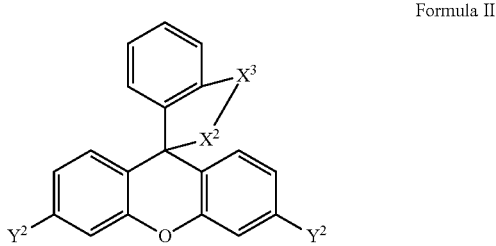

Formula II where $X^2$ can be O, $NR^2$ or S, where $R^2$ is a hydrogen, an alkyl, an aryl, or a heteroalkyl, $X^3$ can be carbonyl (C=O), thiocarbonyl (C=S), or $SO_2$, and each $Y^2$ can independently be $OR^2$, $NR^2_2$ or $SR^2$ where $R^2$ is as defined above. In Formula II, when each $Y^2$ is $OR^2$, the compound is a fluorescein, when each $Y^2$ is $NR^2_2$, the compound is a rhodamine and when one $Y^2$ is $NR^2_2$ and the other $Y^2$ is $OR^2$ the compound is a rhodol. In some embodiments, $X^3$ is a carbonyl, $X^2$ is O or S, and $Y^2$ is $OR^2$, $NR^2_2$ or $SR^2$ where $R^2$ is as defined above. In some embodiments, $X^3$ is a carbonyl, $X^2$ is O, and $Y^2$ is $OR^2$, $NR^2_2$ or $SR^2$ where $R^2$ is as defined above.

Examples of ketazines include those which can be described by Formula III below:

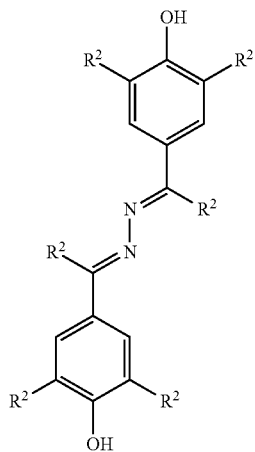

Formula III where each $R^2$ is independently a hydrogen, an alkyl, an aryl, or a heteroalkyl. In some embodiments, each $R^2$ is independently a hydrogen or an alkyl group.

Examples of barbituric acid leuco dyes include those which can be described by Formula IV below:

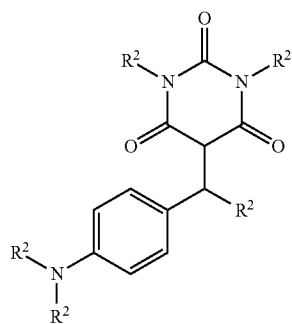

Formula IV where each $R^2$ is independently a hydrogen, an alkyl, an aryl, or a heteroalkyl. In some embodiments, each $R^2$ is independently a hydrogen or an alkyl group.

Examples of thiobarbituric acid leuco dyes include those which can be described by Formula V below:

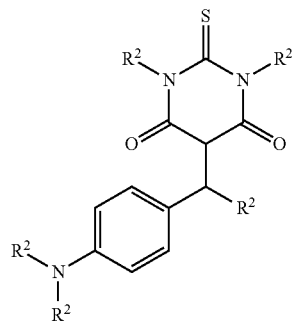

Formula V where each $R^2$ is independently a hydrogen, an alkyl, an aryl, or a heteroalkyl. In some embodiments, each $R^2$ is independently a hydrogen or an alkyl group.

In addition to the above classes of leuco dyes, materials described by Formula VI and Formula VII below may also be useful leuco dyes:

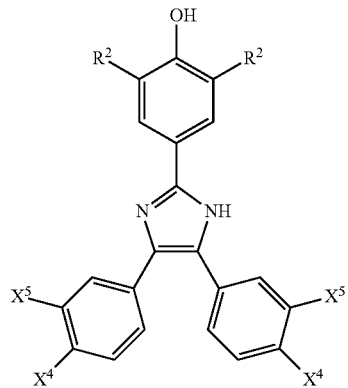

Formula VI where each $R^2$ is independently a hydrogen, an alkyl, an aryl, or a heteroalkyl, each $X^4$ is independently hydrogen, $OR^2$, $NR^2_2$ or $SR^2$, where $R^2$ is as defined above, each $X^5$ is independently hydrogen, $NO_2$ or CN. In some embodiments, each $R^2$ is independently a hydrogen or an alkyl group, each $X^4$ is $OR^3$, where $R^3$ is hydrogen or an alkyl group, and $X^5$ is $NO_2$. In some embodiments, the $X^4$ of one ring is $OR^3$ where $R^3$ is an ethyl group, and the $X^4$ of the other ring is hydrogen, the $X^5$ of one ring is hydrogen and the $X^5$ of the other ring is $NO_2$, and each $R^2$ is tert-butyl.

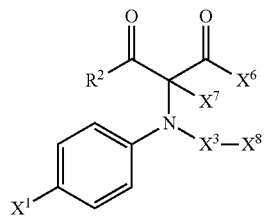

Formula VII where $X^1$ is $OR^2$, $NR^2_2$ or $SR^2$, $X^3$ can be carbonyl (C=O), thiocarbonyl (C=S), or $SO_2$, and each $R^2$ is independently a hydrogen, an alkyl, an aryl, or a heteroalkyl as previously defined above, and $X^6$ is $OR^2$, $NR^2_2$ or $SR^2$, $X^7$ is hydrogen, $OR^2$, or $SR^2$, and $X^8$ is $R^2$, $OR^2$, $NR^2_2$ or $SR^2$. In some embodiments $X^3$ is carbonyl (C=O), or $SO_2$, $X^6$ is $OR^2$, $NR^2_2$ or $SR^2$, $X^7$ is hydrogen, $OR^2$, or $SR^2$, and $X^8$ is $R^2$, $OR^2$, $NR^2_2$ or $SR^2$.

The amount of color forming compound included in the thermally activatable composition varies depending upon the specific color forming compound chosen as well as other factors, such as desired color intensity, cost, etc. Typically the color forming compound is present in the amount of about 0.1-10 weight % or even 0.5-5 weight %.

In addition to the non-linear light to heat converter composition, the color forming compound and the optional polymeric binder, the thermally activatable layer may also contain other additives. Among the useful additives which may be incorporated into the thermally activatable layer, are species which aid the image formation. For example, thermal acid generators may be included. The thermal acid generators release an acid upon thermal excitation. The acid can initiate or catalyze the thermal transformation of the color forming compound permitting more rapid and/or more complete image formation. Suitable thermal acid generators include both materials that generate Bronsted acids (protons) and Lewis acids (electron pair acceptors).

A variety of materials which liberate acid upon heating may be used as a thermal acid generator. For example, Sabongi, G. J., Chemical Triggering-Reactions of Potential Utility in Industrial Processes, Plenum Press, New York, N.Y. (1987), pages 68-72 describes thermally triggered release of carboxylic acids from esters and oxime derivatives, especially benzaldoximes and oxalic acid esters.

Examples of useful thermal acid generators include those disclosed in U.S. Pat. No. 4,670,373 (Kitaguchi et al.), which describes the thermal decomposition of N-carboxy aldoximes to give benzoic acid derivatives as shown below.

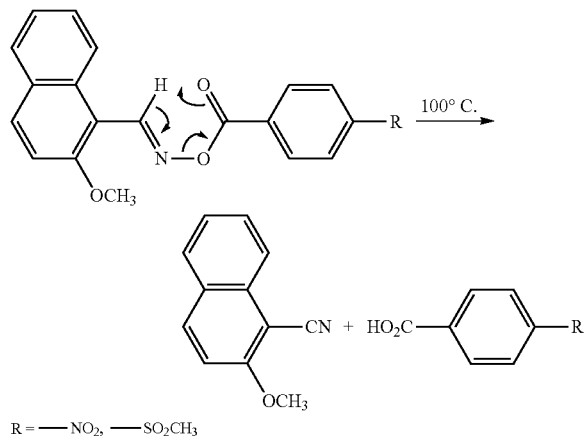

Another class of useful thermal acid generators includes those disclosed in U.S. Pat. No. 4,011,352 (Janssens et al.) which describes the thermal decomposition of the half esters of anhydrides to give stronger dicarboxylic acids as is shown below.

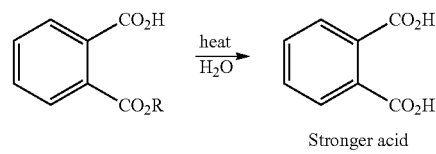

Examples of Lewis acid thermal acid generators include those disclosed in U.S. Pat. No. 2,995,466 (Sorensen) which describes the thermal generation of Lewis acids from diazonium salt acid-progenitors containing counterions such as tetrafluoroborate, hexafluorophosphate, and the like. An example of the acid generation mechanism is shown below.

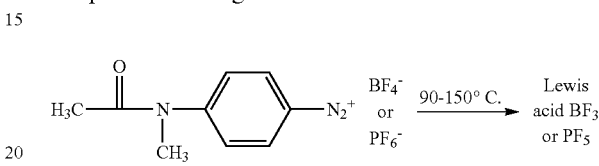

Another example of suitable thermal acid generators includes those disclosed in U.S. Pat. No. 5,554,664 (Lamanna, et al.) which describes the thermal generation of acids from diazonium salts with non-coordinating anionic counterions. Examples of anionic non-coordinating anions include for example highly fluorinated alkylsulfonyl methide, a fluorinated arylsulfonyl methide, a highly fluorinated alkyl sulfonyl imide, a fluorinated arylsulfonyl imide, a mixed aryl- and alkylsulfonyl imides and methides, or combinations thereof.

Another type of suitable thermal acid generator is that described in U.S. Pat. No. 5,278,031 (Boggs et al.), which describes certain squaric acid derivatives as effective heat-sensitive acid generating materials for use in thermal imaging. An example of this thermal transformation is shown below. Squaric acid has reported pKa values of 0.59 and 3.48 (Schwartz and Howard, *J. Phys. Chem.* 74 4374 1970).

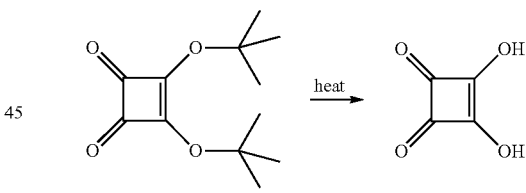

An additional example of a suitable thermal acid generator includes the disclosure of U.S. Pat. No. 5,395,736 (Grasshoff et al.), which describes the exposure of superacid precursors to actinic radiation to generate superacids, which can catalyze the thermal decomposition of secondary acid precursors such as squaric acid derivatives or oxalic acid derivatives in admixture with the superacid precursor, thus increasing the quantity of strong acid present in an imaging medium. Known superacid precursors include diazonium, phosphonium, sulfonium and iodonium compounds. Similarly, U.S. Pat. No. 5,914,213 (Grasshoff et al.) describes a similar process using tosylate and phosphate derivatives as secondary acid precursors.

Another suitable class of thermal acid generators is that disclosed in U.S. Pat. No. 6,627,384 (Kim et al.), which describes cyclic alcohols with adjacent sulfonate leaving groups. The sulfonate leaving groups form acids upon the application of heat as is demonstrated in the mechanism shown below.

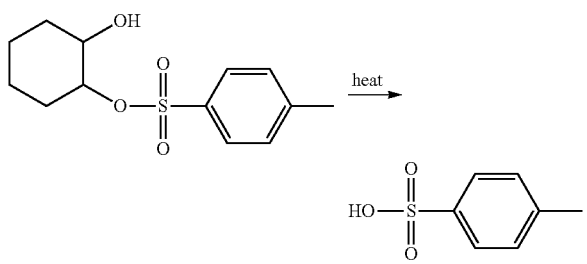

Typically, if used, the thermal acid generator is present in the thermally activatable layer in amounts of about 0.1-10 weight %.

Additionally, the thermally activatable layer may contain fixing additives. Fixing additives are added to fix the image once it is formed. By fixing the image, the image is prevented from undergoing further imaging to alter, obscure, obliterate or otherwise change the image. Examples of fixing additives include, for example, 1-phenyl-3-pyrazolidone, hydroquinones, naphthoquinones, a hydroquinone ethers, naphthoquinone ethers, hydronaphthoquinone ethers, or mixtures thereof.

Typically, if used, the fixing compound is present in the thermally activatable layer in amounts in the range of about 0.05-10 weight %.

FIG. 1 shows a schematic cross section of an embodiment of a multi-layer image-forming construction capable of forming full color images. Multi-layer construction 100 comprises thermally activatable layers 20, 30, 40, and 50. In this embodiment, layer 20 is a cyan thermally activatable layer, layer 30 is a magenta thermally activatable layer, layer 40 is a yellow thermally activatable layer, and 50 is a black thermally activatable layer. Layer 10 is a thermally nonactivatable layer which covers the image formed within the layers 20, 30, 40 and 50. Optional layer 60 is a thermally nonactivatable layer which is below the image and serves as a support layer. Optional layers 15, 25, 35, 45, and 55 are thermally nonactivatable layers which separate the other layers.

The image is formed by selectively activating one or more thermally activatable layers with a light source. Generally the light source is a collimated light source such as a laser. Laser light sources are particularly useful because they are able to provide localized activation, that is, selective activation of a voxel on a single layer within multiple layers. Particularly useful are lasers that are combined with focusing optics to focus the laser output to a specific location along the z axis.

It is desirable that a single laser be able to activate all of the thermally activatable layers. It is also desirable that all thermally activatable layers be activated in a single pass with that laser.

Localized activation, such as activation of a single voxel within a layer, aids in the formation of well-resolved images when the layers within a multi-layer construction form different colors upon activation.

Unlike other multi-layer systems in which each layer is responsive to a different laser wavelength, the multi-layer construction of this disclosure permits color image formation with a single laser. The selective activation is achieved through the use of focusing optics to focus the laser output to a specific location along the z axis. In some embodiments, the laser pulse duration is from 100 picoseconds to 1 microsecond.

Many lasers emit beams with a Gaussian profile, in which case the laser is said to be operating on the fundamental transverse mode, or "TEM$_{00}$ mode" of the laser's optical resonator. The Gaussian beam is a beam of electromagnetic radiation whose transverse electric field and intensity (irradiance) distributions are described by Gaussian functions. For a Gaussian beam, the spot size, w(z), is defined as the radius of the circle around the z axis when the intensity at the circle is $1/e^2$ to that of the center of the circle. When an incident laser beam is focused by a lens, the propagated laser beam spot size, w(z), will be at a minimum value $w_0$ at one place along the beam propagation axis, z, known as the beam waist.

For a beam of wavelength λ at a distance z along the beam from the beam waist, the variation of the spot size is given by equation 7:

$$w(z) = w_0 \sqrt{1 + \left(\frac{z}{z_0}\right)^2} \tag{7}$$

where the origin of the z-axis is defined, without loss of generality, to coincide with the beam waist, and where $z_0$ is called the Rayleigh range and is defined by equation 8:

$$z_0 = \frac{\pi w_0^2}{\lambda}. \tag{8}$$

At a distance from the beam waist equal to the Rayleigh range $z_0$, the width, w, of the beam is defined by equation 9:

$$w(\pm z_0) = w_0 \sqrt{2} \tag{9}$$

The distance between these two points ($+z_0$ and $-z_0$) is called the confocal parameter, b, or the depth of focus of the beam, and is 2 times the Rayleigh range $z_0$.

Another way to describe the laser focus is by the numerical aperture (usually abbreviated NA), which is the refractive index of the lens material, n, times the sine of the half angle of the cone of the focus Θ as shown in equation 10 below:

$$NA = n * \sin\frac{\Theta}{2} \approx \frac{D}{2f} \tag{10}$$

where f is the focal length of the focusing lens and D is the diameter of the lens or the diameter of the laser beam coming into the lens.

The spot size of the focused beam is determined by the numerical aperture defined in equation 10. If the beam incident on the lens has a constant transverse profile, i.e., a flat top beam, the focused spot has an intensity profile described by the Airy disc where the diameter ($2w_o$) of the first dark ring is given by equation 11 below:

$$2w_0 = 1.22\frac{\lambda}{NA} \tag{11}$$

where λ is the laser wavelength. The focused spot size is inversely related to the NA. A comparison of equations 9 and 11, demonstrates that the depth focus of the beam is directly related to the laser wavelength and inversely related to the square of NA.

In this disclosure the laser beam is focused along the z axis, with the beam waist located at the approximate location of a specific thermally activatable layer. Whereas linear absorption processes vary linearly with the light intensity or fluence, the nonlinear absorption processes characteristic of the materials used in this disclosure vary as the intensity or fluence raised to some higher power (such as a quadratic dependence). With a linear absorption process, it is generally not possible to independently activate individual thermally activatable layers, even by focusing the laser beam waist in the middle of the desired thermally activatable layer with a high numeric aperture lens (NA≧0.3). This is due to the resulting depth of focus of the beam being comparable to or greater than typical layer thicknesses. However, when the laser beam waist is located at the location of a thermally activatable layer using the nonlinear intensity or fluence dependence of the absorption processes characteristic of the method of this disclosure, that layer can be activated without significant activation of other thermally activatable layers. This is the result of the effective distance along the z-axis of the nonlinear absorption process being less than the depth of focus of the laser beam. The laser beam intensity or fluence rapidly becomes too low to activate the nonlinear light-to-heat conversion process in adjacent thermally activatable layers.

The methods described in this disclosure may be used to prepare a wide variety of useful articles, including for example, identification documents (ID documents). The term "ID documents" is broadly defined and is intended to include, but not be limited to, for example, passports, driver's licenses, national ID cards, social security cards, voter registration and/or identification cards, birth certificates, police ID cards, border crossing cards, security clearance badges, security cards, visas, immigration documentation and cards, gun permits, membership cards, phone cards, stored value cards, employee badges, debit cards, credit cards, and gift certificates and cards. The methods for forming color images can also be used for items of value, such as, for example, currency, bank notes, checks, and stock certificates, where authenticity of the item is important to protect against counterfeiting or fraud. The methods for forming an image can also be used to produce informative, decorative, or recognizable marks or indicia on product tags, product packaging, labels, charts, maps and the like.

The methods are particularly useful in the formation of ID documents because they permit the formation of a color image that is contained within a multi-layer construction. The multi-layer construction provides for protection of the image from damage, environmental degradation and tampering.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

| Table of Abbreviations | |
|---|---|
| Abbreviation or Trade Designation | Description |
| Dye-1 | A cyan-colored leuco dye, 10-benzoyl-N,N,N',N'-tetraethyl-10H-phenoxazine-3,7-diamine, prepared as described in German Pat. No. DE 2,237,833. |

-continued

| Table of Abbreviations | |
|---|---|
| Abbreviation or Trade Designation | Description |
| CuPC | Copper phthalocyanine |
| Binder-1 | PKHH, poly (bisphenol A epichlorohydrin) glycidyl end-capped copolymer with Mn 1,075. |
| THF | Tetrahydrofuran |
| Dye-2 | yellow leuco dye, 2,6-di-tert-butyl-4-[5-(4-ethoxy-3-nitrophenyl)-4-phenyl-1H-imidazol-2-yl]-phenol, prepared as described below in Synthesis Example S1. |
| Dye-3 | magenta leuco dye prepared as described in U.S. Pat. No. 4,563,415. |

Synthesis Example S1

Preparation of Yellow Leuco Dye Dye-2

Step 1: Preparation of 1-(4-ethoxyphenyl)-2-phenylethane-1,2-dione

The synthesis of 1-(4-ethoxyphenyl)-2-phenylethane-1,2-dione was carried out as described in Nelson, J. Leonard, Richard T. Rapala, Hershel L. Herzog and Elkan R. Blout; J. Am. Chem. Soc.; 71; 1949; 2997-2998. The synthesis is summarized by the equation:

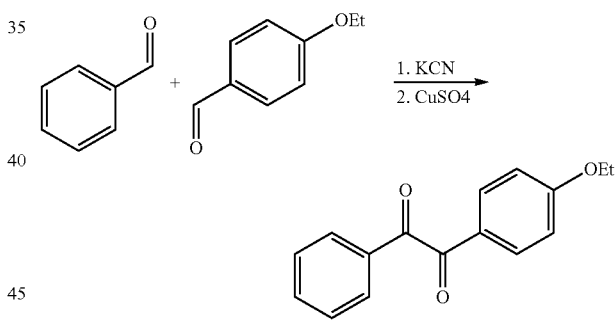

Step 2: Preparation of 1-(4-ethoxy-3-nitrophenyl)-2-phenylethane-1,2-dione

To 0.5 gram of 1-(4-ethoxyphenyl)-2-phenylethane-1,2-dione prepared in Step 1, was add 10 milliliters of concentrated nitric acid and the resulting mixture was heated to 110° C. for 2 hours. The reaction mixture was cooled and poured into 20 milliliters of water. The precipitate was recrystallized from ethanol to give 1-(4-ethoxy-3-nitrophenyl)-2-phenylethane-1,2-dione. The synthesis is summarized by the equation:

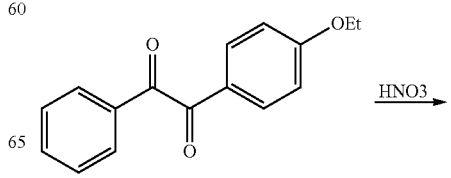

-continued

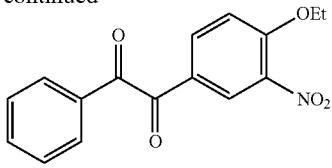

Step 3: Preparation of 2,6-di-tert-butyl-4-[5-(4-ethoxy-3-nitrophenyl)-4-phenyl-1H-imidazol-2-yl]-phenol A mixture of 10.8 grams if 3,5-di-tert-butyl-4-hydroxybenzaldehyde (commercially available from Alfa Aesar), 11.7 grams of 1-(4-ethoxy-3-nitrophenyl)-2-phenylethane-1,2-dione (prepared in Step 2 above), and 27.5 grams of ammonium acetate in 200 milliliters of acetic acid was heated to reflux for 3 hours. The mixture was cooled and poured into water and the precipitate was collected by filtration and then air dried overnight to give 2,6-di-tert-butyl-4-[5-(4-ethoxy-3-nitrophenyl)-4-phenyl-1H-imidazol-2-yl]-phenol. The synthesis is summarized by the equation:

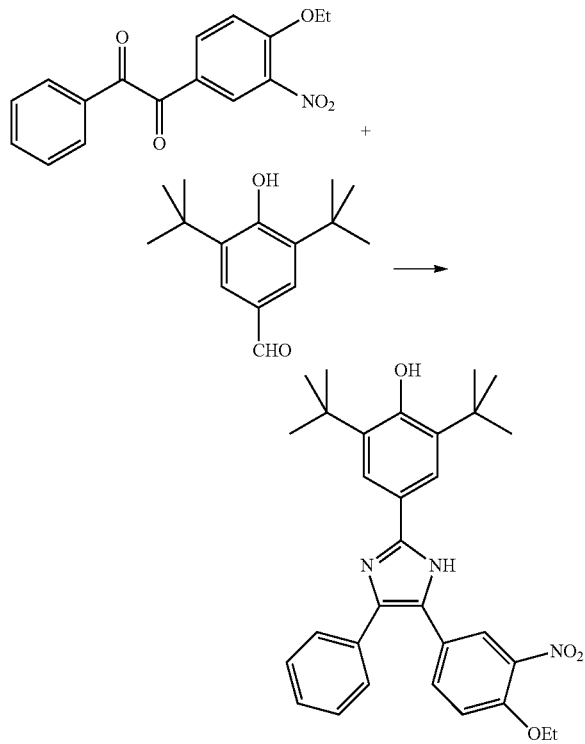

Example 1

The dinitrate salt of Dye 1 was prepared by adding 0.43 grams (1.001 millimoles, 1 eq) of Dye 1 to 60 milliliters of diethyl ether cooled with ice and adding dropwise a solution of 0.1252 milliliters of a 15.99 M solution (2.002 millimoles, 2 eq) of nitric acid in 16 M 10 milliliters of diethyl ether. A white precipitate formed immediately. The mixture was stirred in the ice bath for a few minutes and the white solid was collected, washed with ether, and dried under a vacuum to give the dihydronitrate of Dye 1. A solution containing 1% by weight of the dihydronitrate salt of Dye-1, 1% by weight CuPC, and 20% by weight of Binder-1 in THF was prepared. The solution was solvent coated on a glass plate with a #20 Meyer rod and the solvent was allowed to dry. A diode pumped Nd:YAG laser (commercially available from IB Laser Berlin, Germany) at the second harmonic wavelength (532 nanometers), with pulse duration of 10 nanoseconds, and a pulse repetition rate of 1,000 Hz was used to mark the dye-coated sample. The output of the laser was coupled to an optical fiber, collimated by a lens with a focal length of 150 millimeters and focused on the sample by a lens with a focal length of 30 millimeters. This assembly was held by a robot arm with the laser focal spot a distance of 6 millimeters away from the sample. The laser was moved at 1 millimeter per second and the single pulse energy from the laser was either 1.0 milliJoules or 0.5 milliJoules at the sample. The cyan lines were successfully engraved.

Comparative Example C1

A solution containing 1% by weight of Dye-1, and 20% by weight of Binder-1 in THF was prepared. The solution was solvent coated on a glass plate with a #20 Meyer rod and the solvent was allowed to dry. A diode pumped Nd:YAG laser (commercially available from IB Laser Berlin, Germany) at the fundamental wavelength (1.064 micrometers), with pulse duration of 10 nanoseconds, and a pulse repetition rate of 400 Hz was used to mark the dye-coated sample. The output of the laser was coupled to an optical fiber, collimated by a lens with a focal length of 150 millimeters and focused on the sample by a lens with a focal length of 30 millimeters. This assembly was held by a robot arm with the laser focal spot a distance of 6 millimeters away from the sample. The laser was moved at 1 millimeter per second and the single pulse energy from the laser was 1.5 milliJoules at the sample. No color change was observed.

Example 2

A solution of 20 weight % solids in THF was prepared containing 400 milligrams of Binder-1, 40 milligrams phthalic acid, 40 milligrams of Dye-1, 40 milligrams of magnesium nitrate, and 0.5 milligrams of CuPC. The solution was solvent coated on a glass plate with a #20 Meyer rod and the solvent was allowed to dry. A diode pumped Nd:YAG laser (commercially available from IB Laser Berlin, Germany) at the second harmonic wavelength (532 nanometers), with pulse duration of 10 nanoseconds, and a pulse repetition rate of 1,000 Hz was used to mark the dye-coated sample. The output of the laser was coupled to an optical fiber, collimated by a lens with a focal length of 150 millimeters and focused on the sample by a lens with a focal length of 30 millimeters. This assembly was held by a robot arm with the laser focal spot a distance of 6 millimeters away from the sample. The laser was moved at 1 millimeter per second and the single pulse energy from the laser was either 1.0 milliJoules or 0.5 milliJoules at the sample. Cyan lines were successfully engraved.

Example 3

A solution of 20 weight % solids in THF was prepared containing 400 milligrams of Binder-1, 40 milligrams phthalic acid, 40 milligrams of Dye-3, 40 milligrams of magnesium nitrate, and 0.5 milligrams of CuPC. The solution was solvent coated on a glass plate with a #20 Meyer rod and the solvent was allowed to dry. A diode pumped Nd:YAG laser (commercially available from IB Laser Berlin, Germany) at the second harmonic wavelength (532 nanometers), with pulse duration of 10 nanoseconds, and a pulse repetition rate of 1,000 Hz was used to mark the dye-coated sample. The output of the laser was coupled to an optical fiber, collimated by a lens with a focal length of 150 millimeters and focused on the sample by a lens with a focal length of 30 millimeters. This assembly was held by a robot arm with the laser focal spot a distance of 6 millimeters away from the sample. The laser was moved at 1 millimeter per second and the single pulse energy from the laser was either 1.0 milliJoules or 0.5 milliJoules at the sample. Magenta lines were successfully engraved.

Example 4

A solution of 20 weight % solids in THF was prepared containing 400 milligrams of Binder-1, 40 milligrams phthalic acid, 40 milligrams of Dye-1, 40 milligrams of magnesium nitrate, and 0.5 milligrams of CuPC. The solution was solvent coated on a glass plate with a #20 Meyer rod and the solvent was allowed to dry. A diode pumped Nd:YAG laser (commercially available from IB Laser Berlin, Germany) at the second harmonic wavelength (532 nanometers), with pulse duration of 10 nanoseconds, and a pulse repetition rate of 1,000 Hz was used to mark the dye-coated sample. The output of the laser was coupled to an optical fiber, collimated by a lens with a focal length of 100 millimeters to form a beam 18 millimeters in diameter. The laser was then focused on the sample by a lens with a focal length of 25 millimeters. This assembly was placed on an Aerotech (Pittsburgh, Pa.) sample stage. The laser spot focused on the sample was around 200 micrometers in diameter. Imaged samples were prepared by varying the laser output and the sample stage translation speed. At an average laser output of 0.535 milliJoules per pulse and sample stage translation speed of 1.0 millimeter per second bright cyan colored lines were engraved.

What is claimed is:

1. A method for generating a color image comprising:
   providing a multi-layer construction comprising at least one thermally activatable layer comprising a thermally activatable composition; and
   activating the at least one thermally activatable layer with energy from a light source to form an image;
   wherein the thermally activatable composition comprises at least one non-linear light to heat converter composition and at least one color forming compound.

2. The method of claim 1 wherein the activating step comprises selectively activating a single thermally activatable layer by focusing the energy from the light source within the thermally activatable layer.

3. The method of claim 1 wherein the color forming compound comprises a leuco dye.

4. The method of claim 3 wherein the leuco dye comprises an oxazine, a diazine, a thiazine, a fluorescein, a rhodamine, a rhodol, a ketazine, a xanthene, a thiolactone-based leuco dye, a barbituric acid leuco dye, a thiobarbituric acid leuco dye or combination thereof.

5. The method of claim 1 wherein the thermally activatable composition further comprises a thermal acid generator.

6. The method of claim 1 wherein the non-linear light to heat converter composition comprises a metallophthalocyanine, a naphthalocyanine, a cyanine, a fullerene, a metal nanoparticle, a metal oxide nanoparticle, a metal cluster compound, a porphyrin, an indanthrone derivative or combination thereof.

7. The method of claim 1 wherein the non-linear light to heat converter composition comprises copper phthalocyanine, tin phthalocyanine, or a combination thereof.

8. The method of claim 5 wherein the thermal acid generator comprises a diazonium salt with a tetrafluoroborate or hexafluorophosphate counterion, a diazonium salt with a highly fluorinated alkylsulfonyl methide counterion, a fluorinated arylsulfonyl methide, a highly fluorinated alkyl sulfonyl imide, a diazonium salt with a fluorinated arylsulfonyl imide counterion, a diazonium salt with a mixed aryl- and alkylsulfonyl imide or methide counterion, a cyclic alcohol with adjacent sulfonate leaving groups, or combinations thereof.

9. The method of claim 1 wherein the light source is a focused laser.

10. The method of claim 9 wherein the focused laser is operated such that it has a pulse duration from 100 picoseconds to 1 microsecond.

11. The method of claim 1 wherein the multi-layer construction comprises at least 3 thermally activatable layers.

12. The method of claim 11 wherein the at least 3 thermally activatable layers each comprise a different thermally activatable composition, the thermally activatable compositions being selected from thermally activatable compositions which are cyan-forming, magenta-forming, and yellow-forming.

13. The method of claim 1 wherein the multi-layer construction comprises at least 4 thermally activatable layers wherein the at least 4 thermally activatable layers each comprise a different thermally activatable composition, the thermally activatable compositions being selected from thermally activatable compositions which are cyan-forming, magenta-forming, yellow-forming and black-forming.

14. The method of claim 1 wherein the thermally activatable layer further comprises a fixing additive.

15. The method of claim 14 further comprising a step of fixing the image.

16. The method of claim 14 wherein the fixing additive comprises 1-phenyl-3-pyrazolidone, a hydroquinone, a naphthoquinone, a hydroquinone ether, a naphthoquinone ether, a hydronaphthoquinone ether, or mixtures thereof.

17. The method of claim 1 wherein the multi-layer construction comprises at least one thermally non-activatable layer.

18. The method of claim 17 wherein at least one thermally non-activatable layer is nearer to the light source than the at least one thermally activatable layer.

19. The method of claim 17 wherein at least one thermally non-activatable layer is further from the light source than the at least one thermally activatable layer.

20. The method of claim 1 wherein the multi-layer construction comprises a second thermally activatable layer and at least one thermally non-activatable layer between the at least one thermally activatable layer and the second thermally activatable layer.

* * * * *

UNITED STATES PATENT AND TRADEMARK OFFICE
CERTIFICATE OF CORRECTION

Page 1 of 1

PATENT NO. : 8,411,120 B2
APPLICATION NO. : 12/990799
DATED : April 2, 2013
INVENTOR(S) : Pingfan Wu et al.

It is certified that error appears in the above-identified patent and that said Letters Patent is hereby corrected as shown below:

In the Drawings
Sheet 1, Line 13, Below "60" insert -- FIG. 1 --.

In the Specifications

Column 6
Line 49, Delete "absorders" and insert -- absorbers --, therefor.

Column 7
Line 31, Delete "hω" and insert -- ηω --, therefor.
Line 43, Delete "2hω," and insert -- 2ηω --, therefor.

Signed and Sealed this
Twelfth Day of November, 2013

Teresa Stanek Rea
*Deputy Director of the United States Patent and Trademark Office*